July 22, 1924.
H. C. SEIPP
HEATER
Filed Jan. 20, 1922   3 Sheets-Sheet 1
1,501,923
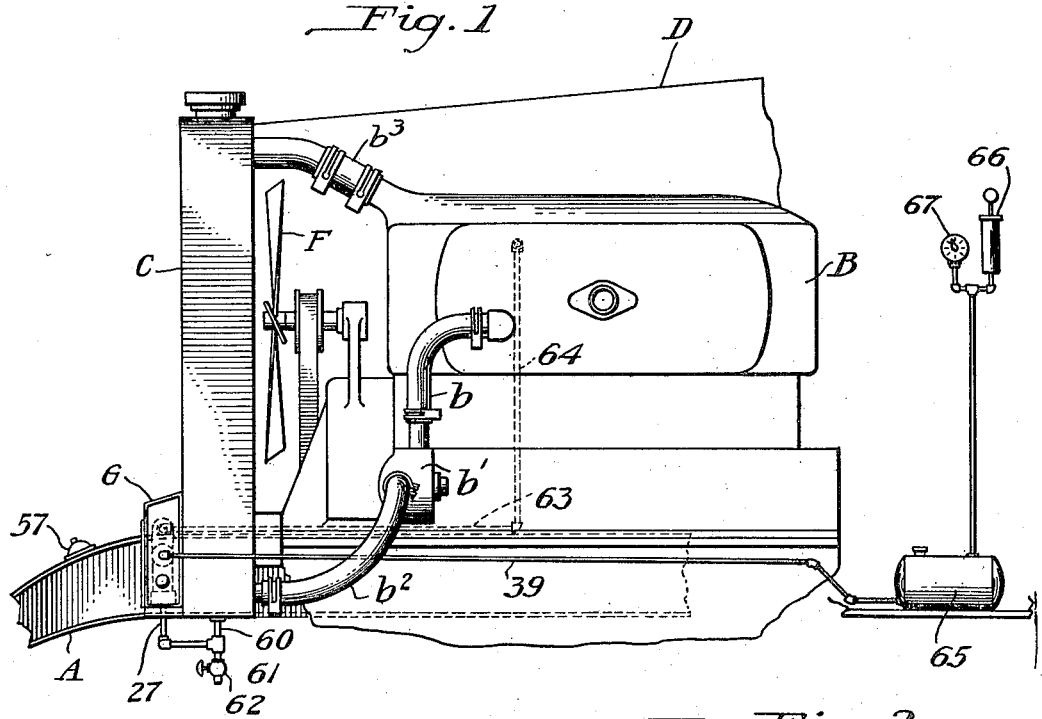
Fig. 1
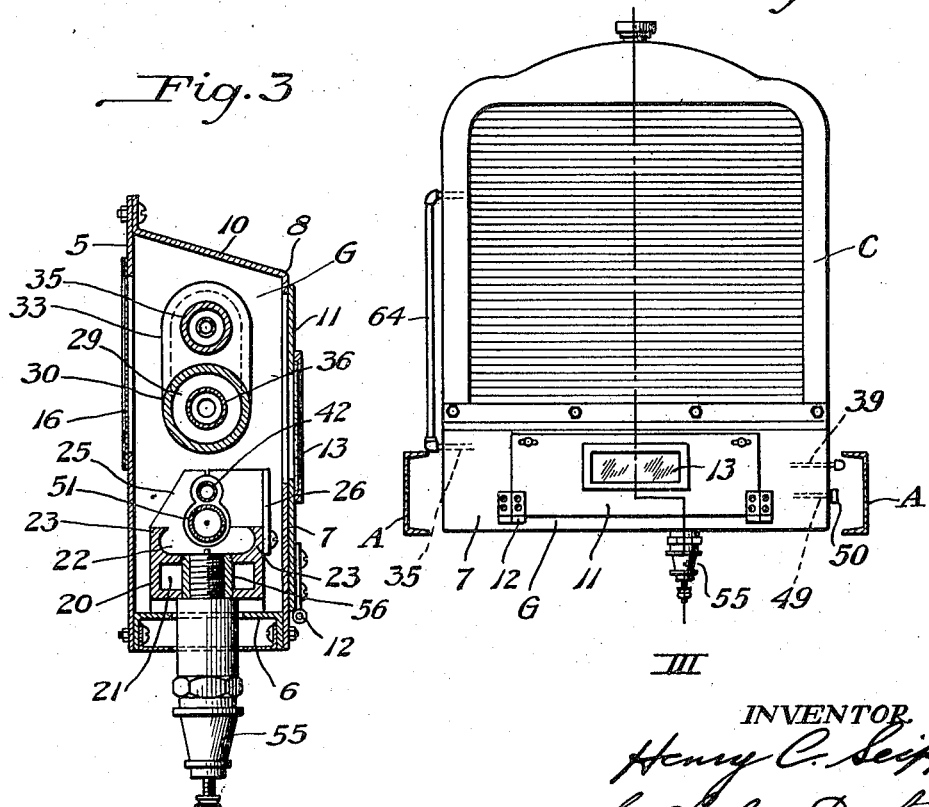
Fig. 2
Fig. 3
INVENTOR.
Henry C. Seipp
by Clarke & Doolittle
his attorney July 22, 1924.

H. C. SEIPP

HEATER

Filed Jan. 20, 1922

INVENTOR
Henry C. Seipp
by Clarke & Doolittle
his attorneys.

July 22, 1924.

H. C. SEIPP

HEATER

Filed Jan. 20, 1922   3 Sheets-Sheet 3

1,501,923

INVENTOR
Henry C. Seipp
by Charles Doolittle
his attorney

Patented July 22, 1924.

1,501,923

UNITED STATES PATENT OFFICE.

HENRY C. SEIPP, OF PITTSBURGH, PENNSYLVANIA.

HEATER.

Application filed January 20, 1922. Serial No. 530,648.

*To all whom it may concern:*

Be it known that I, HENRY C. SEIPP, a citizen of the United States, residing at Pittsburgh, in the county of Allegheny and State of Pennsylvania, have invented certain new and useful Improvements in Heaters, of which the following is a specification.

This invention is for an improvement in a heater of the type shown in my United States Patent No. 1,279,455 of September 17, 1918, particularly adapted for use on automobiles.

Heaters of this type are designed to be placed against the front of an automobile radiator, preferably near the bottom thereof, and to be connected by suitable pipes with the water circulating system of the automobile for maintaining the water at an elevated temperature to prevent the freezing thereof when the automobile is parked in the open in cold weather, or kept in an unheated garage, and to facilitate starting the motor in cold weather.

The object of the present invention is to provide an improved heater which may be readily attached to automobiles having a water cooled engine, and which is simply constructed and designed to give efficient heating.

Further objects are to provide a device which will be neat in appearance and compact, and which will be convenient to operate.

These and other objects are attained by the novel construction and arrangement of parts hereinafter more fully described in the accompanying drawings, in which:

Fig. 1 represents a longitudinal section through an automobile with my invention applied thereto, the heater, radiator, and engine being shown in elevation;

Fig. 2 is a front elevation of the radiator with the automobile frame in section and the radiator and heater in elevation;

Fig. 3 is a vertical section on line III—III of Fig. 2 through the heater;

Figure 4:
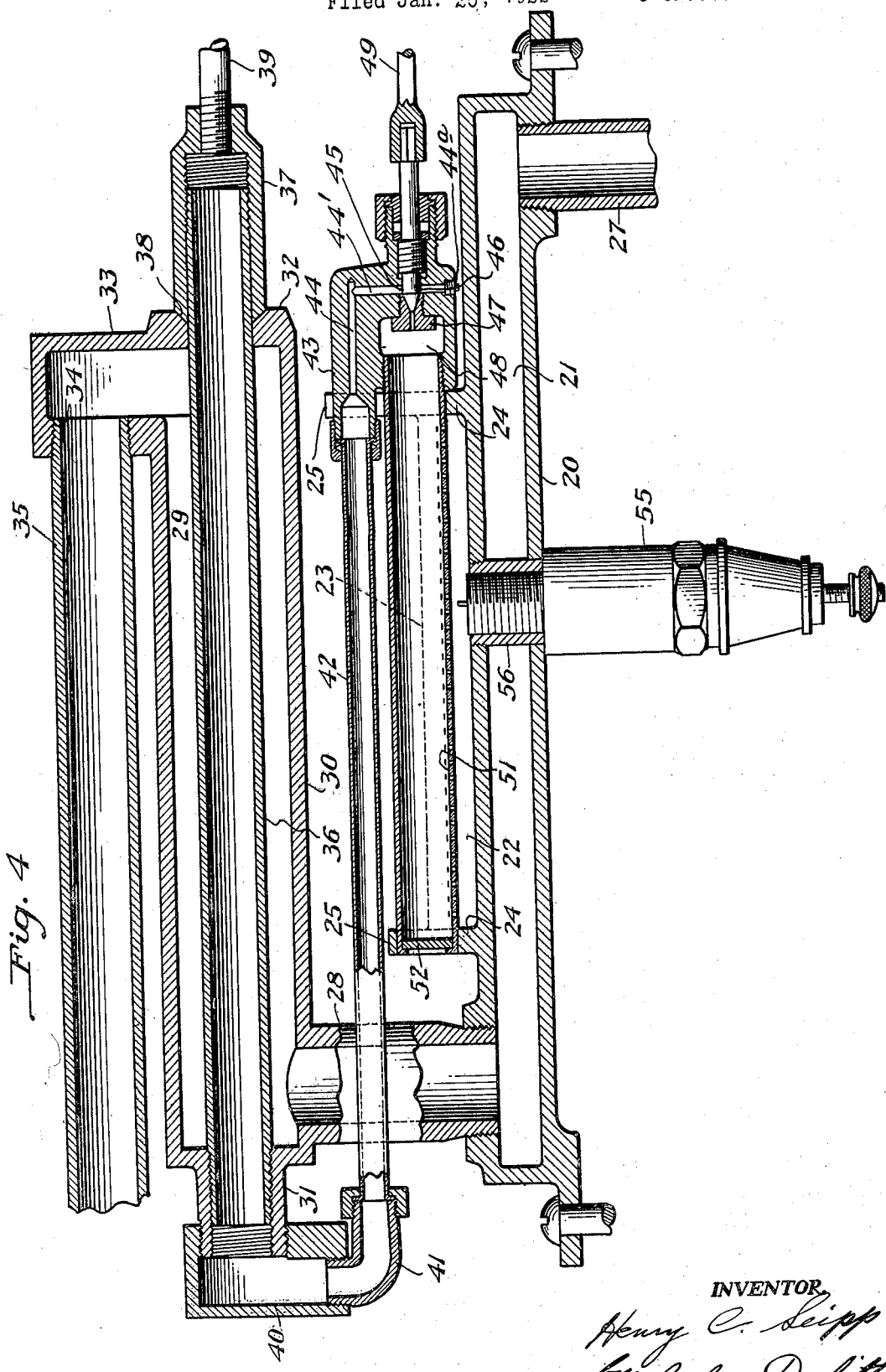
Fig. 4 is a vertical longitudinal section through the burner of the heater, the view being on a full size scale.

In the drawings, A indicates the side frame members of an automobile, B is the water cooled motor, and C is the radiator. D indicates the hood.

The engine or motor B may be of any standard or preferred design having jackets therein through which water is circulated for cooling it, $b$ indicating the water inlet pipe connected through pump $b'$ and pipe $b^2$ with the bottom of the radiator C. Pipe and connections $b^3$ serve to conduct the hot water from the motor to the top of the radiator C. Behind the radiator is the usual fan F.

The heater is designated generally as G, and comprises a casing or housing which is preferably formed of some light sheet metal of the desired strength, such as sheet aluminum. The casing preferably includes a back plate 5 to the bottom of which is bolted a horizontal bottom member 6. The front plate 7 is bolted to a flange on the bottom 6, and the upper portion thereof is bent at 8 to provide a sloping top 10 which is bolted to the upper edge of back plate 5.

In the front wall 7 is an opening giving access to the interior of the casing and which is provided with a door 11 hinged at its lower edge in hinges 12 in such manner that the door swings downwardly from a vertical to a horizontal position when being opened. In the door is a window 13 over which is a suitable transparent covering.

Figure 5:
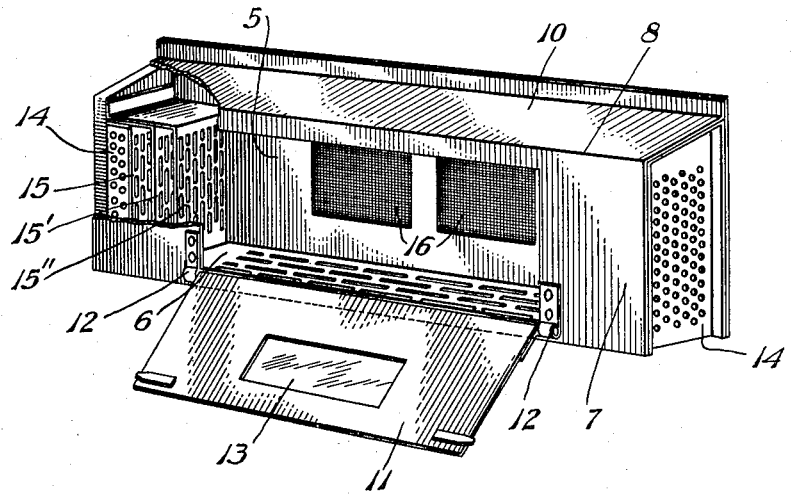
Fig. 5 is a perspective view of the heater casing, showing the door open and the burner removed.

At each end of the casing are end plates 14 which are preferably provided with a large number of small openings therein for admitting air to the casing. Inside of the casing at each end is a series of baffles, preferably in the form of apertured sheets 15, 15' and 15" arranged one back of another, as clearly shown in Fig. 5.

In the back wall 5 of the heater are also openings 16 which are preferably covered with fine mesh wire screen or gauze. These serve as heat outlet openings.

Within the casing is a hydrocarbon fuel burner and water heater. It comprises a hollow base member 20 which is rectangular in shape and has a rectangular chamber 21 therein. On the upper surface of the base member is formed a channel 22 between side walls 23, the inner faces of which are curved, as shown in Fig. 3. The ends of the channel are closed by integrally cast transverse ribs 24. Extending up from the ribs at one side thereof and integral therewith are vertical supports 25 for the purpose hereinafter described. Supports 26, removably secured to the base member 20, are provided for cooperation with the supports 25. These supports are clearly shown in Fig. 3.

Entering the bottom of the base 20 at one end is a water inlet pipe 27, and leading out of the top of the base at the opposite end is a riser pipe 28. The upper end of pipe 28 communicates with a chamber 29 in shell or casing 30. The shell 30 is formed at one end with an exteriorly and interiorly threaded extension 31 and the other end is provided with a boss 32 and a vertical part 33 in which is a threaded opening 34 into which is screwed a horizontal pipe 35. Passing through an opening in the boss, and longitudinally through chamber 29, with its inner end threaded into the extension 31, is a fuel pipe 36 of relatively large diameter. A coupling 37 is screwed onto the outer projecting threaded end of pipe 36. The inner end of this coupling is beveled to seat in a bevel on the boss 32, as indicated at 38. The outer end of coupling 37 has a reduced interiorly threaded opening therein into which is threaded a small fuel supply pipe 39.

Threaded onto the exterior of extension 31 is a depending member 40 which is disposed at a slight angle from the vertical and screwed into the lower end thereof is an elbow 41. Connected with the elbow 41 is a fuel pipe 42 having its other end screwed into a carburetor 43.

The carburetor 43 is preferably in the form of a single casting having an upper part with which pipe 42 is detachably connected, and through which is a horizontal fuel passage 44 of restricted diameter which communicates with a vertical passage 44' leading to needle valve chamber 45. The lower end of the vertical passage 44' is closed by a screw plug 44ª. The needle valve is indicated at 46, and 47 is a spud in which is a small opening providing the fuel jet. The fuel and air mixer is at 48, directly below the connection between the fuel pipe 42 and the carburetor. The needle valve stem is operated by a suitable key 49 having a knob 50 outside of the casing. Threaded into the mixer 48 is a burner tube 51 having burner openings on the lower side thereof. The tube is closed at 52. The inner end of the carburetor is clamped between one of the fixed supports 25 and one of the removable members 26, while the burner tube is similarly held by the other support. The burner may be easily cleaned, when necessary, by removing pipe 42 to clean it. A cleaner may then be pushed into passage 44. By removal of plug 44ª, passage 44' may be cleaned in a similar way. The removal of spud 47 enables the needle valve and jet to be cleaned.

For lighting the fuel at the burner, I preferably provide an electric ignition. This includes a spark plug 55 threaded into a bushing 56 which extends through the base 20. The spark plug is inverted and the electrodes thereof are in the channel 22 directly beneath the burner. This plug is connected in the usual manner (not shown) with a suitable source of high voltage current, and is controlled by a push button 57 preferably on the front of the vehicle near the heater.

Figure 6:
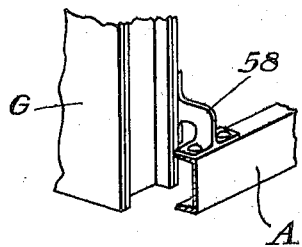
Fig. 6 shows a means for supporting the heater on a vehicle frame.

The heater casing is suitably supported in front of the radiator C with the back plate 5 in contact therewith, suitable brackets, such as brackets 58 shown in Fig. 6, being employed. These brackets are attached to the frame member A at each side of the car and to the back plate.

At the bottom of the radiator C is the usual drain pipe 60. In applying my device to a vehicle, the cock usually provided on pipe 60 is removed and a T 61 substituted. The drain cock 62 is connected with one branch of the T, while water inlet pipe 27 is connected with the stem branch of the T. Pipe 35 at the top of the burner extends out to one side of the casing where it connects with a rearwardly extending pipe 63, which has its other end connected to a vertical section of pipe 64. The vertical pipe 64 connects with a short stub of pipe that is threaded into the motor casing and communicates with the water jacket of the engine.

The fuel supply pipe 39 connects with a fuel tank 65 which is preferably independent of the fuel supply of the vehicle. This tank may be equipped with a small hand pump 66 and a pressure gauge 67 which, if desired, may be placed on the vehicle dash. The tank is preferably placed on the running board and may be concealed in a suitable casing, although it may be secured in any other suitable place. Gasoline is preferably used as fuel and only a small tank is necessary for the operation of the heater for an extended time.

In operation, the device is applied to the vehicle in the manner described. To start the heater, the pump 66 is operated to establish one or two pounds pressure in the fuel tank. Needle valve 46 is opened a slight amount by operation of knob 50 and atomized fuel is forced from the jet 47, entering the burner tube 51 after becoming mixed with air. Button 57 is pushed, making a spark at the electrodes of plug 55. This ignites the combustible mixture that escapes from the perforations in the burner tube.

The burner described causes the fuel to burn with a hot blue flame. The flames heat the base 20 and the sides 23 thereof. The curvature of the inner faces of sides 23 deflect the flames and hot gases upwardly and toward the center, heating fuel pipe 42 to a high degree, whereby more efficient combustion is obtained after the burner has been in operation for a few minutes.

The heated gases then pass under and around casing 30 and eventually escape through the openings 16 in the back wall 5 of the casing. The escaping heated air and gases of combustion pass through some of the cells of the radiators, thereby heating them. Water from the cooling system of the engine will, of course, enter the base 20 through the pipe 27, which communicates with the radiator. The water in the base, becoming heated, passes up passage 28 into chamber 29 in casing 30. The sides 23 on the base serve as fins to conduct heat into the base 20. The water in chamber 29 is heated to a higher degree and passes up the vertical portion 33 into pipe 35, which is also in a heated atmosphere. From pipe 35 it goes into the top of the engine B through the pipes described. It will gradually pass down around the sides of the engine, due to the colder water moving through pipe $b$, pump $b'$, and pipe $b^2$, to the base of the radiator into the heater, through pipe 27.

As the water in the engine becomes warmer, warmer water will flow into the base of the radiator through pipe $b^3$, establishing convective currents in the radiator, so that the colder water will move toward the base and into pipe 27, while warmer water will rise through the radiator. With a small consumption of fuel, the temperature of all the water can be raised and maintained at a satisfactory temperature for enabling the engine to be started in the coldest weather. As the heater will often be lighted immediately after the engine has been stopped, the water in the cooling system will be hot and the heater will then function to maintain it at an elevated temperature.

Pipe 36, inside the casing 30, being relatively large proportionately to the fuel supply pipe, forms an auxiliary tank or reservoir which is surrounded by water where the fuel will get a preliminary heating. The fuel is thus first heated to substantially the temperature of the water in the casing, and then heated almost or to the point of volatilization. The fuel is, therefore, readily atomized in the carburetor, and an intensely hot flame may therefore be obtained. By proper regulation of the needle valve, the size of the flame can be controlled and the burner turned on or off. The general arrangement of the burner and heater parts horizontally enables the casing to have the required width and a minimum height, so that only a small area of the radiator need be covered.

Figure 7:
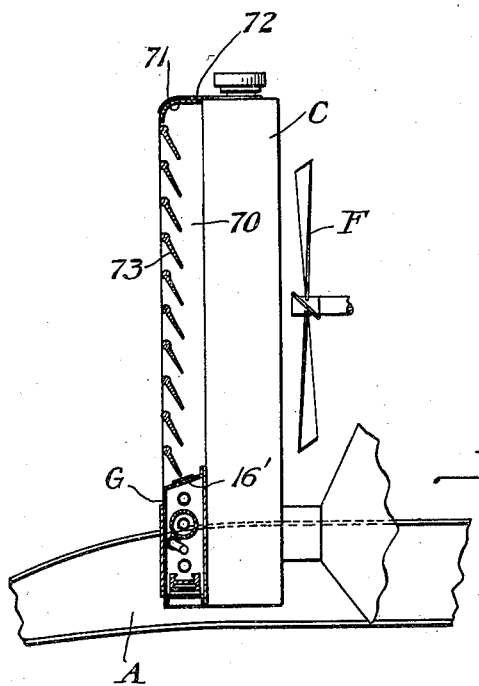
Fig. 7 is a vertical transverse section through a modified arrangement in which louvers are associated with the heater at the front of the radiator.

In Fig. 7, I have shown a modification in which parts similar to those in the construction hereinbefore described have been designated by similar reference characters. The modification consists primarily in the combination of the heater with the louvers for the front of the radiator. In the modification, openings 16 are omitted from the back wall of the casing and openings 16' are placed in the top thereof. The sides of the casing extend upwardly to the top of the radiator, as indicated at 70, and are connected by a cover portion 71. The top may be provided with a strap 72 adapted to embrace the filling spout on the radiator to hold the top close to the radiator. Horizontally pivoted louver vanes 73 are provided between the sides, and they are arranged to be opened and closed in any preferred way, not shown, mechanisms for effecting this being well known in the art.

Figure 8:
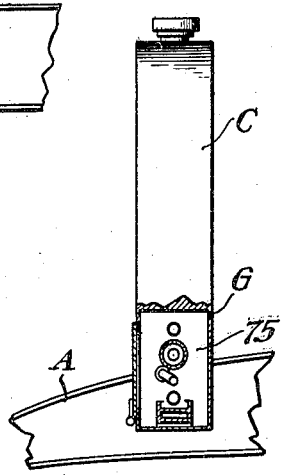
Fig. 8 is a view showing part of the radiator in section and part in elevation, showing a modified construction.

As shown in Fig. 8, the radiator may be specially constructed with a chamber 75 in the bottom thereof to receive the heater.

Various other changes and modifications may be made within the contemplation of my invention and within the scope of the appended claims.

I claim as my invention:

1. The combination with an automobile having a water cooled engine, of a circulation system therefor including a radiator, pipes for conducting water to and from the engine to and from the radiator, a heater for maintaining the water in the cooling system at an elevated temperature comprising a casing having a burner and water heating means therein, a pipe leading from the bottom of the radiator to the heater, a riser pipe leading from the heater to the engine, and means for conducting heated gases from the burner to the radiator.

2. The combination with an automobile having a water cooled engine, of a circulation system therefor including a radiator, a pipe for conducting water from the top of the engine to the top of the radiator, a pipe for conducting water from the bottom of the radiator to the engine, a water heater secured at the front of the radiator, a pipe connecting the water heater with the lower part of the radiator, a pipe for delivering heated water from the heater to the engine, and means for conducting the heated gases from the burner to the radiator.

3. A heating device for use in connection with a water circulating system comprising a relatively long housing adapted to be disposed in a horizontal position, and a water heating device in the housing comprising a base having a chamber therein, means for supplying water from a circulating system thereto, a relatively long horizontal casing having a chamber therein disposed over the base, means for enabling water to pass from the base to the casing, an outlet adapted to connect with the circulating system in the casing, and a burner disposed between the base and the casing and arranged to heat them both.

4. A heating device for use in connection with a water circulating system comprising a relatively long housing adapted to be disposed in a horizontal position, and a water heating device in the housing comprising a base having a chamber therein, means for supplying water from a circulating system thereto, a relatively long horizontal, cylindrical casing having a chamber therein disposed over the base, means for enabling water to pass from the base to the casing, an outlet adapted to connect with the circulating system in the casing, and a burner disposed between the base and the casing and arranged to heat them both.

5. A heating device for use in connection with a water circulating system comprising a relatively long housing adapted to be disposed in a horizontal position, and a water heating device in the housing comprising a base having a chamber therein, means for supplying water from a circulating system thereto, a relatively long horizontal casing having a chamber therein disposed over the base, a fuel pipe extending longitudinally of the casing, means for supplying fuel to one end thereof, means for enabling water to pass from the base to the casing, an outlet in the casing, an outlet pipe connected therewith, a burner disposed between the base and the casing, and a pipe connected with the fuel pipe in the casing and with the burner and disposed over the burner for supplying it with fuel, said burner being arranged to heat the casing and base.

6. A heating device for use in connection with a water circulating system comprising a relatively long housing adapted to be disposed in a horizontal position, and a water heating device in the housing comprising a base having a chamber therein, means for supplying water from a circulating system thereto, a relatively long horizontal, cylindrical casing disposed over the base, a pipe connecting one end of the casing and base, an outlet pipe adapted to connect with the water circulating system leading from the other end of the casing, a fuel pipe extending longitudinally of the casing and of sufficient diameter to provide a relatively small reservoir in which fuel is heated, a relatively small fuel supply pipe connecting with one end thereof, a discharge at the other end thereof, a burner disposed over the base and under the casing, a carburetor for the burner, and a pipe connecting said discharge with the carburetor, said pipe being relatively small and being disposed over the burner in such manner as to be heated therefrom, said burner being arranged to heat the base and casing.

7. A heating device for use in connection with a water circulating system comprising a relatively long housing adapted to be disposed in a horizontal position, and a water heating device in the housing comprising a base having a chamber therein, means for supplying water from a circulating system thereto, a relatively long horizontal casing having a chamber therein disposed over the base, means for enabling water to pass from the base to the casing, an outlet adapted to connect with the circulating system in the casing, a burner disposed between the base and the casing and arranged to heat them both, and a spark plug passing through said base and having its electrode beneath the burner whereby the burner may be lighted electrically.

In testimony whereof I affix my signature.

HENRY C. SEIPP.